United States Patent
Lardeux et al.

(10) Patent No.: US 11,538,086 B2
(45) Date of Patent: Dec. 27, 2022

(54) RECOMMENDER SYSTEMS AND METHODS USING CASCADED MACHINE LEARNING MODELS

(71) Applicant: Amadeus S.A.S., Biot (FR)

(72) Inventors: Benoit Lardeux, Roquefort-les-Pins (FR); David Renaudie, Valbonne (FR); Rodrigo Alejandro Acuna Agost, Golfe Juan (FR); Eoin Thomas, Antibes (FR); Mourad Boudia, Valbonne (FR); Papa Birame Sane, Vallauris (FR)

(73) Assignee: Amadeus S.A.S., Biot (FR)

( * ) Notice: Subject to any disclaimer, the term of this patent is extended or adjusted under 35 U.S.C. 154(b) by 244 days.

(21) Appl. No.: 16/661,511

(22) Filed: Oct. 23, 2019

(65) Prior Publication Data
US 2020/0134696 A1    Apr. 30, 2020

(30) Foreign Application Priority Data
Oct. 31, 2018 (FR) ...................................... 1860077

(51) Int. Cl.
*G06Q 30/00*      (2012.01)
*G06Q 30/06*      (2012.01)
(Continued)

(52) U.S. Cl.
CPC ..... *G06Q 30/0631* (2013.01); *G06F 16/9535* (2019.01); *G06N 20/00* (2019.01);
(Continued)

(58) Field of Classification Search
CPC ............... G06Q 30/02; G06Q 30/0631; G06Q 30/0633; G06Q 20/00; G06Q 16/9535; H04L 67/306
See application file for complete search history.

(56) References Cited

U.S. PATENT DOCUMENTS

| | | | |
|---|---|---|---|
| 9,652,797 B2* | 5/2017 | Vijayaraghavan | .... G06F 16/951 |
| 10,007,957 B2* | 6/2018 | Ganis | .................... G06Q 50/14 |

(Continued)

FOREIGN PATENT DOCUMENTS

| | | | | |
|---|---|---|---|---|
| HU | WO2012013996 | * | 2/2012 | ......... G06Q 30/0631 |
| WO | 2012013996 A1 | | 2/2012 | |

OTHER PUBLICATIONS

Li, Susan. "Machine Learning Model for Predicting Click-Through in Hotel Online Ranking." https://towardsdatascience.com Sep. 29, 2018. (Year: 2018).*

(Continued)

*Primary Examiner* — Luis A Brown
(74) *Attorney, Agent, or Firm* — Thompson Hine LLP (57) ABSTRACT

Computer-implemented methods of providing personalized recommendations to a user of items available in an online system, and related systems. First-level features including context features are computed based upon context data. A first-level machine learning model is then evaluated using the first-level features to generate predictions of user behavior in relation to a plurality of individual items available via the online system. A list of proposed item recommendations is constructed based upon the predictions. Second-level features are computed based upon the context data and list features based upon the list of proposed item recommendations and the corresponding predictions generated by the first-level machine learning model. A second-level machine learning model is evaluated using the second-level features to generate a prediction of user behavior in relation to the list of proposed item recommendations. A personalized list of item recommendations is provided based upon the prediction generated by the second-level machine learning model.

12 Claims, 6 Drawing Sheets

(51) Int. Cl.
*G06N 20/00* (2019.01)
*G06F 16/9535* (2019.01)
*G06Q 10/02* (2012.01)
*G06Q 30/02* (2012.01)
*H04L 67/306* (2022.01)

(52) U.S. Cl.
CPC ......... *G06Q 10/02* (2013.01); *G06Q 30/0242* (2013.01); *G06Q 30/0253* (2013.01); *G06Q 30/0254* (2013.01); *G06Q 30/0633* (2013.01); *H04L 67/306* (2013.01)

(56) References Cited

U.S. PATENT DOCUMENTS

| | | | | |
|---|---|---|---|---|
| 10,152,740 | B2* | 12/2018 | Becker | G06Q 30/0631 |
| 10,375,200 | B2* | 8/2019 | Solenthaler | H04L 67/306 |
| 10,395,294 | B2* | 8/2019 | Legrand | G06Q 30/0625 |
| 10,650,432 | B1* | 5/2020 | Joseph | G06N 3/08 |
| 10,740,824 | B2* | 8/2020 | Becker | G06Q 30/0283 |
| 10,824,940 | B1* | 11/2020 | Rybakov | G06N 3/08 |
| 10,861,077 | B1* | 12/2020 | Liu | G06Q 30/0631 |
| 11,023,947 | B1* | 6/2021 | Bosley | G06Q 30/0631 |
| 11,341,153 | B2* | 5/2022 | Stein | G06F 16/248 |
| 2002/0161664 | A1* | 10/2002 | Shaya | G06Q 30/0282 705/26.7 |
| 2010/0100416 | A1* | 4/2010 | Herbrich | G06Q 30/0633 705/7.32 |
| 2014/0279208 | A1* | 9/2014 | Nickitas | G06Q 30/0631 705/26.7 |
| 2014/0297337 | A1* | 10/2014 | Geraci | G06Q 30/0631 705/5 |
| 2015/0032737 | A1* | 1/2015 | Badenes | G06F 16/00 707/723 |
| 2015/0058050 | A1* | 2/2015 | Tebourbi | G06Q 30/02 705/5 |
| 2015/0286959 | A1* | 10/2015 | Hauviller | G06Q 30/0623 705/5 |
| 2016/0063597 | A1* | 3/2016 | Goulart | G06Q 50/01 705/26.7 |
| 2016/0110794 | A1* | 4/2016 | Hsiao | G06K 9/6277 705/26.7 |
| 2016/0350669 | A1* | 12/2016 | Jurka | G06F 16/958 |
| 2017/0132230 | A1* | 5/2017 | Muralidhar | G06F 16/9535 |
| 2017/0132509 | A1* | 5/2017 | Li | G06N 3/0427 |
| 2017/0155737 | A1* | 6/2017 | Jannink | H04L 67/306 |
| 2018/0025010 | A1* | 1/2018 | Ramer | H04N 21/251 707/727 |
| 2018/0063276 | A1* | 3/2018 | Foged | H04L 51/52 |
| 2018/0121986 | A1* | 5/2018 | Akkiraju | G06Q 30/0631 |
| 2018/0137555 | A1* | 5/2018 | Clausse | G06Q 30/0282 |
| 2018/0165746 | A1* | 6/2018 | Huang | G06F 16/90335 |
| 2018/0285957 | A1* | 10/2018 | Ng | G06N 5/003 |
| 2018/0365599 | A1* | 12/2018 | Hajji | G06Q 10/02 |
| 2019/0188774 | A1* | 6/2019 | Lehr | G06N 20/00 |
| 2019/0236488 | A1* | 8/2019 | Achan | G06Q 30/0251 |
| 2020/0005192 | A1* | 1/2020 | Kumar | G06N 5/025 |
| 2020/0111147 | A1* | 4/2020 | Kanagovi | G06N 20/00 |
| 2020/0134695 | A1* | 4/2020 | Avlani | G06Q 30/0255 |
| 2020/0134696 | A1* | 4/2020 | Lardeux | G06Q 30/0633 |

OTHER PUBLICATIONS

Burke, Robin. "Hybrid Recommender Systems: Survey and Experiments." User Modeling and User-Adapted Interaction, vol. 12, pp. 331-370, 2002. (Year: 2002).*

Lardeaux, et al. "Cascaded Machine Learning Model for Efficient Hotel Recommendations from Air Travel Bookings." Rec Tour 2019, Sep. 19, 2019, Copenhagen, Denmark. (Year: 2019).*

Fei Xiao, Shichen Lu, et al. "Cascade Ranking for Operational E-Commerce Search." KDD 17, Applied Data Science Paper, Aug. 13-17, 2017, Halifax, NS, Canada. (Year: 2017).*

Susan Li, "Machine Learning Model for Predicting Click-Through in Hotel Online Ranking", Sep. 29, 2018, retrieved from the internet at https://towardsdatascience.com/machine-learning-model-for-predicting-click-through-in-hotel-online-ranking-d55fc18c8516.

Robin Burke, "Hybrid Recommender Systems: Survey and Experiments", User Modeling and User-Adapted Interaction vol. 12, pp. 331-370(2002).

National Institute of Industrial Property, Preliminary Search Report and Written Opinion issued in French Patent Application No. 1860077 dated May 31, 2019, and English translation thereof.

European Patent Office, Official Action issued in Application No. 19204224.0 dated Feb. 24, 2021.

\* cited by examiner

RECOMMENDER SYSTEMS AND METHODS USING CASCADED MACHINE LEARNING MODELS

FIELD OF THE INVENTION

The present invention relates generally to technical methods and systems for automated provision of personalized product and/or service recommendations. In particular, embodiments of the invention employ machine learning technologies in the implementation of improved online recommender systems.

BACKGROUND

Recommender systems are widely deployed in online services, including e-commerce, news, information, and entertainment systems. A recommender system functions to present products, services, or other items (e.g. books, music, movies, TV programs, news stories, web pages, publications, travel services, software applications, and/or other consumer goods and services) to users. Many recommender systems employ filtering and other technical methods to identify items that are likely to be of interest to the user, i.e. to make personalized recommendations.

For example, a recommender system that provides personalized recommendations may compare a user profile to some reference characteristics, and endeavour to predict a user rating, level of interest, or probability of action (such as a link-click, or purchase decision) for goods, services, or other items with which the user has not previously interacted. The user profile may be constructed from information that has been explicitly provided by the user (e.g. age, gender, stated interests, ratings and reviews provided for other items, place of residence) and/or implicitly, based upon user behaviors and actions (e.g. visited web pages, links clicked, entertainment programs consumed, past purchasing behavior). Reference characteristics may be explicitly assigned according to characteristics of the goods, services, or other items themselves (i.e. a 'content-based' approach) or may be derived implicitly from the environment and characteristics of users collectively (i.e. a 'collaborative filtering' approach).

Recommender systems typically present a user with multiple personalized recommendations, e.g. in the form of a list. Conventionally, such a list may be constructed by generating predictions of user interest for all available items, and selecting the top-ranked items for inclusion in the list. This approach may be effective to the extent that users with similar profiles have similar preferences, and are therefore interested in items having similar reference characteristics. However, the information available to a recommender system is necessarily incomplete, and the system is therefore subject to uncertainty and imperfect predictive power. For example, user behavior may be influenced by preferences and interests that are not well-captured by available user profile content, or by aspects of items that are not well-captured by available reference characteristics. Simply presenting a user with a list of items that have been individually highly-ranked by the recommender system may therefore not reflect the user's true interests or preferences.

The quality of recommendations is of great importance. Recommendations that do not align with user interests may create dissatisfaction, which may harm the reputation of the provider, and cause users to prefer the services of other providers. More immediately, poor-quality recommendations are unlikely to result in desired user interactions, such as additional item selection and purchase decisions. Conversely, high-quality recommendations may result in high levels of user satisfaction, since users are provided with suggestions that are strongly aligned with their interests, and generate desirable outcomes for the provider, including enhanced reputation, strong user retention, and increased revenue. Effective recommender systems are therefore mutually beneficial to users and providers alike.

In practice, user satisfaction with recommendations provided by a recommender system does not rely upon interest in all items included in a list, but whether there is at least one item of sufficient interest to prompt further action. Simply presenting individually top-ranked items in the presence of incomplete information and uncertainty may therefore not produce a desirable result, due to the possibility that if one item in the list is not of interest to the user, then the same may be true for all of the other items, since they were selected based on the substantially the same criteria.

It is therefore an objective of embodiments of the present invention to provide a technical solution in the form of a machine-learning-based recommender system that addresses the limitations of basing suggestions on individual item scores and rankings, so as to increase overall user satisfaction and interaction with recommendation lists.

SUMMARY

In one aspect, the invention provides a computer-implemented method of providing personalized recommendations to a user of items available in an online system, the method comprising:

receiving, via a communications channel, context data comprising user information;

computing a plurality of first-level features comprising context features based upon the context data;

evaluating a first-level machine learning model using the first-level features to generate predictions of user behavior in relation to a plurality of individual items available via the online system;

constructing a list of proposed item recommendations based upon the predictions generated by the first-level machine learning model;

computing a plurality of second-level features comprising context features based upon the context data and list features based upon the list of proposed item recommendations and the corresponding predictions generated by the first-level machine learning model;

evaluating a second-level machine learning model using the second-level features to generate a prediction of user behavior in relation to the list of proposed item recommendations; and providing, via the communications channel, a personalized list of item recommendations based upon the prediction generated by the second-level machine learning model.

Advantageously, embodiments of the invention thus employ two-level cascaded machine learning models, operating at the individual item level (i.e. first level), and at the item list level (i.e. second level), in order to generate lists of recommendations. The second-level machine learning model has the benefit of additional features that may be derived from the output of the first-level machine learning model, which may enable improved predictions of user behaviors, such as item selection (e.g. 'click') and list conversion (e.g. purchase) rates.

In embodiments of the invention, the steps of constructing the list of proposed item recommendations, computing the plurality of second-level features, and evaluating the second-level machine learning model are repeated iteratively, wherein each iteration further comprises:

prior to computing the plurality of second-level features, swapping a proposed item recommendation in the list of proposed item recommendations based upon the predictions generated by the first-level machine learning model to generate a test list of proposed item recommendations;

after evaluating the second-level machine learning model to generate a prediction of user behavior in relation to the test list of proposed item recommendations, comparing the prediction of user behavior in relation to the test list of proposed item recommendations with a prediction computed on a prior iteration; and in the event that the comparison determines that the prediction of user behavior in relation to the test list of proposed item recommendations is more favourable than the prediction computed on the prior iteration, replacing the list of proposed item recommendations with the test list of proposed item recommendations.

Advantageously, this 'swapping' strategy enables overall probability of user interaction with one or more items in the list of recommendations to be improved, or ideally maximised, as compared with simply presenting a list of item recommendations generated by the first-level machine learning model alone.

According to an exemplary 'exhaustive' swapping strategy, the step of swapping a proposed item recommendation in the list of proposed item recommendations comprises selecting a swap that generates a previously untested list of recommendations from the plurality of individual items for which predictions were generated by the first-level machine learning model, and the iteration continues until a stopping condition is satisfied. The stopping condition may be that all potential lists of recommendations have been exhausted.

According to an alternative swapping strategy, the step of swapping a proposed item recommendation in the list of proposed item recommendations comprises selecting a swap that enhances at least one of the second level features relative to an expected change in the prediction of user behavior in relation to the test list of proposed item recommendations, and the iteration continues until a stopping condition is satisfied. The stopping condition may be that the prediction of user behavior in relation to the list of proposed item recommendations is not expected to become substantially more favourable by further iteration.

In embodiments of the invention, the first-level machine learning model is trained using item features associated with each available item, and historical data of prior user behavior in response to presentations of personalized recommendations. The second-level machine learning model may then be trained using the historical data of prior user behavior in response to presentations of personalized recommendation and corresponding prediction data generated by evaluation of the first-level machine learning model.

Advantageously, training the two-level cascaded machine learning models using a combination of item features and historical data, including the user context in which prior behaviors have been recorded, enables embodiments of the invention to develop a more complete and enriched knowledge regarding user interactions with recommendations in context, and thereby to generate improved predictions of behavior.

The list features may include one or more aggregated list features, such as an average prediction of user behavior in relation to individual items included in the list of proposed item recommendations; minimum item cost of individual items included in the list of proposed item recommendations; number of items in the list of proposed item recommendations; average value of a rating score associated with individual items in the list of proposed item recommendations; range of costs of individual items included in the list of proposed item recommendations; and/or range of values of a rating score associated with individual items in the list of proposed item recommendations.

In embodiments of the invention, predictions of user behavior may comprise one or more of: a probability of the user clicking on a link corresponding with an item presented in the personalized list of item recommendations; and a probability of the user completing an online purchase of an item presented in the personalized list of item recommendations.

In another aspect, the invention provides a recommender system for providing personalized recommendations to a user of items available in an online system, the system comprising:

a computer-implemented single-item machine learning module comprising a first-level machine learning model configured to receive a plurality of first-level features and to generate a corresponding prediction of user behavior in relation to a plurality of individual items available via the online system;

a computer-implemented item list machine learning module comprising a second-level machine learning model configured to receive a plurality of second-level features and to generate a corresponding prediction of user behavior in relation to a list of proposed item recommendations; and a computer-implemented list builder module configured to:
  receive context data comprising user information;
  compute the plurality of first-level features comprising context features based upon the context data;
  obtain predictions of user behavior in relation to a plurality of individual items available via the online system from the single-item machine learning module based upon the first-level features;
  construct the list of proposed item recommendations based upon the predictions obtained from the single-item machine learning module;
  compute the plurality of second-level features comprising context features based upon the context data and list features based upon the list of proposed item recommendations and the corresponding predictions generated by the first-level machine learning model
  obtain a prediction of user behavior in relation to the list of proposed item recommendations from the item list machine learning module based upon the second-level features; and
  provide a personalized list of item recommendations based upon the prediction obtained from the item list machine learning module.

In a further aspect, the invention provides a computing system for providing personalized recommendations to a user of items available in an online system, the computing system comprising:

a processor;

at least one memory device accessible by the processor; and a communications interface accessible by the processor, wherein the memory device contains body of program instructions which, when executed by the processor, cause the computing system to implement a method comprising steps of:
  receiving, via the communications interface, context data comprising user information;

computing a plurality of first-level features comprising context features based upon the context data;

evaluating a first-level machine learning model using the first-level features to generate predictions of user behavior in relation to a plurality of individual items available via the online system;

constructing a list of proposed item recommendations based upon the predictions generated by the first-level machine learning model;

computing a plurality of second-level features comprising context features based upon the context data and list features based upon the list of proposed item recommendations and the corresponding predictions generated by the first-level machine learning model;

evaluating a second-level machine learning model using the second-level features to generate a prediction of user behavior in relation to the list of proposed item recommendations; and providing, via the communications interface, a personalized list of item recommendations based upon the prediction generated by the second-level machine learning model.

In yet another aspect, the invention provides a computer program product comprising a computer-readable medium having instructions stored thereon which, when executed by a processor implement a method of providing personalized recommendations to a user of items available in an online system, the method comprising:

receiving, via a communications channel, context data comprising user information;

computing a plurality of first-level features comprising context features based upon the context data;

evaluating a first-level machine learning model using the first-level features to generate predictions of user behavior in relation to a plurality of individual items available via the online system;

constructing a list of proposed item recommendations based upon the predictions generated by the first-level machine learning model;

computing a plurality of second-level features comprising context features based upon the context data and list features based upon the list of proposed item recommendations and the corresponding predictions generated by the first-level machine learning model;

evaluating a second-level machine learning model using the second-level features to generate a prediction of user behavior in relation to the list of proposed item recommendations; and providing, via the communications channel, a personalized list of item recommendations based upon the prediction generated by the second-level machine learning model.

Further aspects, advantages, and features of embodiments of the invention will be apparent to persons skilled in the relevant arts from the following description of particular embodiments. It will be appreciated, however, that the invention is not limited to the embodiments described, which are provided in order to illustrate the principles of the invention as defined in the foregoing statements and in the appended claims, and to assist skilled persons in putting these principles into practical effect.

BRIEF DESCRIPTION OF THE DRAWINGS

Embodiments of the invention will now be described with reference to the accompanying drawings, in which like reference numerals refer to like features, and wherein.

DETAILED DESCRIPTION

Figure 1:
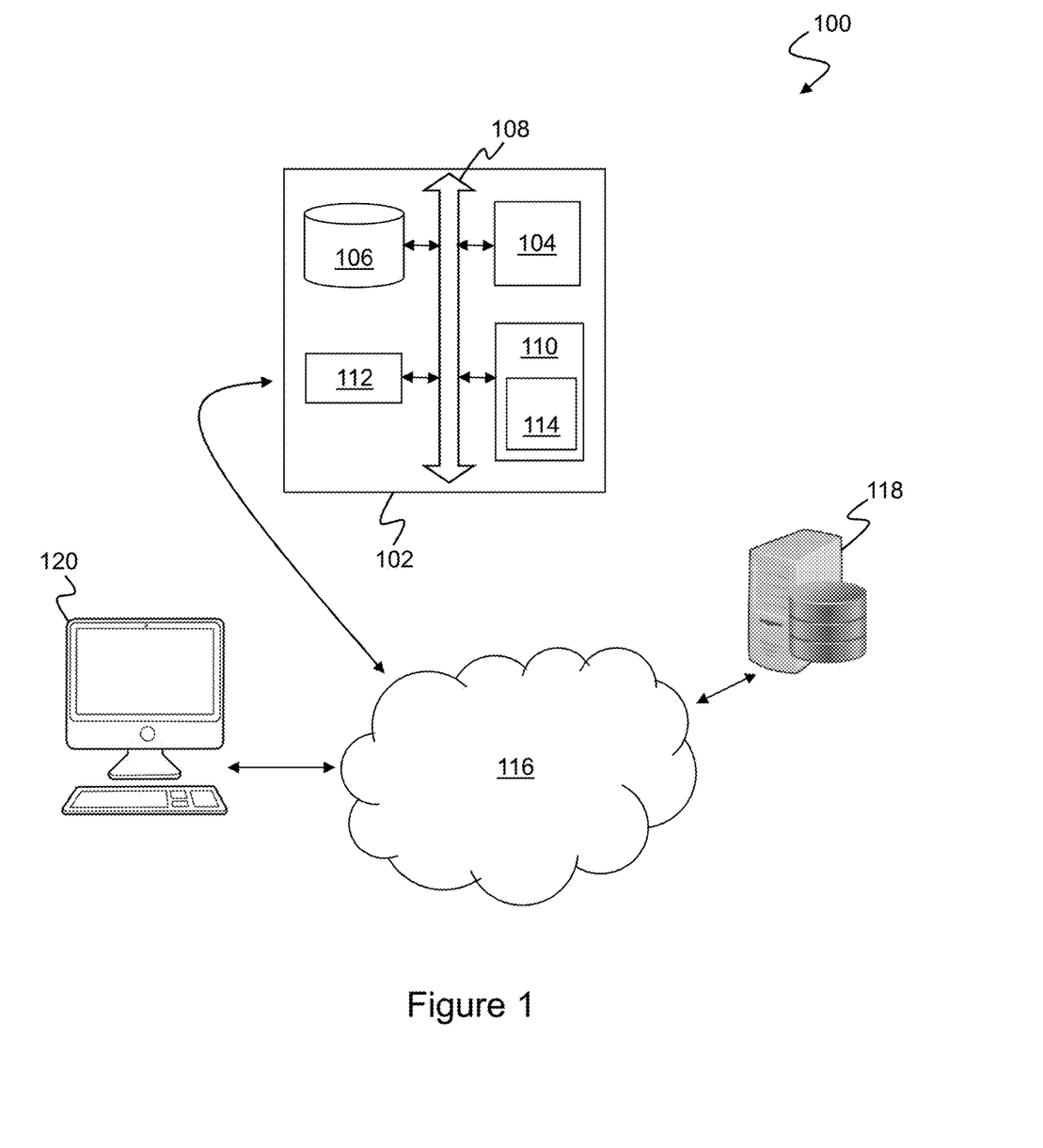
FIG. 1 is a block diagram illustrating an exemplary networked system including a recommender system embodying the invention.

FIG. 1 is a block diagram illustrating an exemplary networked system 100 including a recommender system 102 embodying the invention. In particular, the recommender system 102 comprises a machine learning system configured to generate lists of personalized recommendations of goods, services, or other items, in accordance with an embodiment of the invention.

The recommender system 102 may comprise a computer system having a conventional architecture. In particular, the recommender system 102, as illustrated, comprises a processor 104. The processor 104 is operably associated with a non-volatile memory/storage device 106, e.g. via one or more data/address busses 108 as shown. The non-volatile storage 106 may be a hard disk drive, and/or may include a solid-state non-volatile memory, such as ROM, flash memory, solid-state drive (SSD), or the like. The processor 104 is also interfaced to volatile storage 110, such as RAM, which contains program instructions and transient data relating to the operation of the recommender system 102.

In a conventional configuration, the storage device 106 maintains known program and data content relevant to the normal operation of the recommender system 102. For example, the storage device 106 may contain operating system programs and data, as well as other executable application software necessary for the intended functions of the recommender system 102. The storage device 106 also contains program instructions which, when executed by the processor 104, cause the recommender system 102 to perform operations relating to an embodiment of the present invention, such as are described in greater detail below, and with reference to FIGS. 2 to 6 in particular. In operation, instructions and data held on the storage device 106 are transferred to volatile memory 110 for execution on demand.

The processor 104 is also operably associated with a communications interface 112 in a conventional manner. The communications interface 112 facilitates access to a wide-area data communications network, such as the Internet 116.

In use, the volatile storage 110 contains a corresponding body 114 of program instructions transferred from the storage device 106 and configured to perform processing and other operations embodying features of the present invention. The program instructions 114 comprise a technical contribution to the art developed and configured specifically to implement an embodiment of the invention, over and above well-understood, routine, and conventional activity in the art of machine learning systems, as further described below, particularly with reference to FIGS. 2 to 6.

With regard to the preceding overview of the recommender system 102, and other processing systems and devices described in this specification, terms such as 'processor', 'computer', and so forth, unless otherwise required by the context, should be understood as referring to a range of possible implementations of devices, apparatus and systems comprising a combination of hardware and software. This includes single-processor and multi-processor devices and apparatus, including portable devices, desktop computers, and various types of server systems, including cooperating hardware and software platforms that may be co-located or distributed. Physical processors may include general purpose CPUs, digital signal processors, graphics processing units (GPUs), field-programmable gate arrays (FPGAs), application-specific integrated circuits (ASICs), and/or other hardware devices suitable for efficient execution of required programs and algorithms. As will be appreciated by persons skilled in the art, GPUs in particular may be employed for high-performance implementation of machine learning models comprising various embodiments of the invention, under control of one or more general purpose CPUs.

Computing systems may include conventional personal computer architectures, or other general-purpose hardware platforms. Software may include open-source and/or commercially-available operating system software in combination with various application and service programs. Alternatively, computing or processing platforms may comprise custom hardware and/or software architectures. For enhanced scalability, computing and processing systems may comprise cloud computing platforms, enabling physical hardware resources to be allocated dynamically in response to service demands. While all of these variations fall within the scope of the present invention, for ease of explanation and understanding the exemplary embodiments are described herein with illustrative reference to single-processor general-purpose computing platforms, commonly available operating system platforms, and/or widely available consumer products, such as desktop PCs, notebook or laptop PCs, smartphones, tablet computers, and so forth.

In particular, the terms 'processing unit' and 'module' are used in this specification to refer to any suitable combination of hardware and software configured to perform a particular defined task, such as accessing and processing offline or online data, executing training steps of a machine learning model, executing evaluation steps of a machine learning model, or executing recommendation list generation and update steps. Such a processing unit or module may comprise executable code executing at a single location on a single processing device, or may comprise cooperating executable code modules executing in multiple locations and/or on multiple processing devices. For example, in some embodiments of the invention, generation of lists of personalized recommendations may be performed entirely by code executing on a single system, such as the recommender system 102, while in other embodiments corresponding processing may be performed in a distributed manner over a plurality of systems.

Software components, e.g. program instructions 114, embodying features of the invention may be developed using any suitable programming language, development environment, or combinations of languages and development environments, as will be familiar to persons skilled in the art of software engineering. For example, suitable software may be developed using the C programming language, the Java programming language, the C++ programming language, the Go programming language, the Python programming language, the R programming language, and/or other languages suitable for implementation of machine learning algorithms. Development of software modules embodying the invention may be supported by the use of machine learning code libraries such as the TensorFlow, Torch, and Keras libraries. It will be appreciated by skilled persons, however, that embodiments of the invention involve the implementation of software structures and code that are not well-understood, routine, or conventional in the art of machine learning systems, and that while pre-existing libraries may assist implementation, they require specific configuration and extensive augmentation (i.e. additional code development) in order to implement the specific structures, processing, computations, and algorithms described below, particularly with reference to FIGS. 2 to 6.

The foregoing examples of languages, environments, and code libraries are not intended to be limiting, and it will be appreciated that any convenient languages, libraries, and development systems may be employed, in accordance with system requirements. The descriptions, block diagrams, flowcharts, equations, and so forth, presented in this specification are provided, by way of example, to enable those skilled in the arts of software engineering and machine learning to understand and appreciate the features, nature, and scope of the invention, and to put one or more embodiments of the invention into effect by implementation of suitable software code using any suitable languages, frameworks, libraries and development systems in accordance with this disclosure without exercise of additional inventive ingenuity.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media may include volatile and non-volatile, and removable and non-removable, tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. While a computer readable storage medium may not comprise transitory signals per se (e.g. radio waves or other propagating electromagnetic waves, electromagnetic waves propagating through a transmission media such as a waveguide, or electrical signals transmitted through a wire), computer readable program instructions may be downloaded via such transitory signals to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general-purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

Continuing the discussion of FIG. 1, the networked system 100 also includes a service provider system 118. By way of providing a concrete example in order to illustrate the principles of the invention, the service provider 118 may be an online travel service sales or e-commerce system. As is well-known, a user may employ a web browser, or other application software, in order to access the travel service system 118 via the Internet 116 from their own personal computer 120, or other suitable device. A user interaction with the system 118 may typically involve a number of sequential events or actions, such as logging in, searching and/or browsing for services (such as flights, accommodation, and so forth), selecting and reviewing services, adding services to an electronic shopping cart, and executing a checkout process (e.g. providing payment details, and confirming purchase). At one or more points within such an interaction, it may be desirable to provide the user with personalized recommendations of additional products or services that may be of interest. For example, once a user has selected a travel service, such as flights to a particular destination, it may be desirable to present a list of personalized recommendations for accommodation, rental vehicles, restaurants, and/or other travel-related products and services associated with the destination.

It should be appreciated, however, that embodiments of the invention are not limited to providing recommendations in respect of travel-related services, but may be applied to a range of online services for which personalized recommendations may be desired. Such services include other e-commerce services (e.g. online retailers of consumer goods), entertainment (e.g. video and/or audio streaming) services, information (e.g. news) services, and so forth. As will be understood from the following disclosure with reference to online travel services, embodiments of the invention may be employed in a broad range of applications in which recommendations may be derived, and relevant machine learning models trained, based upon user profiles and/or interactions with individual recommended items, and user interactions with lists of recommended items.

Figure 2:
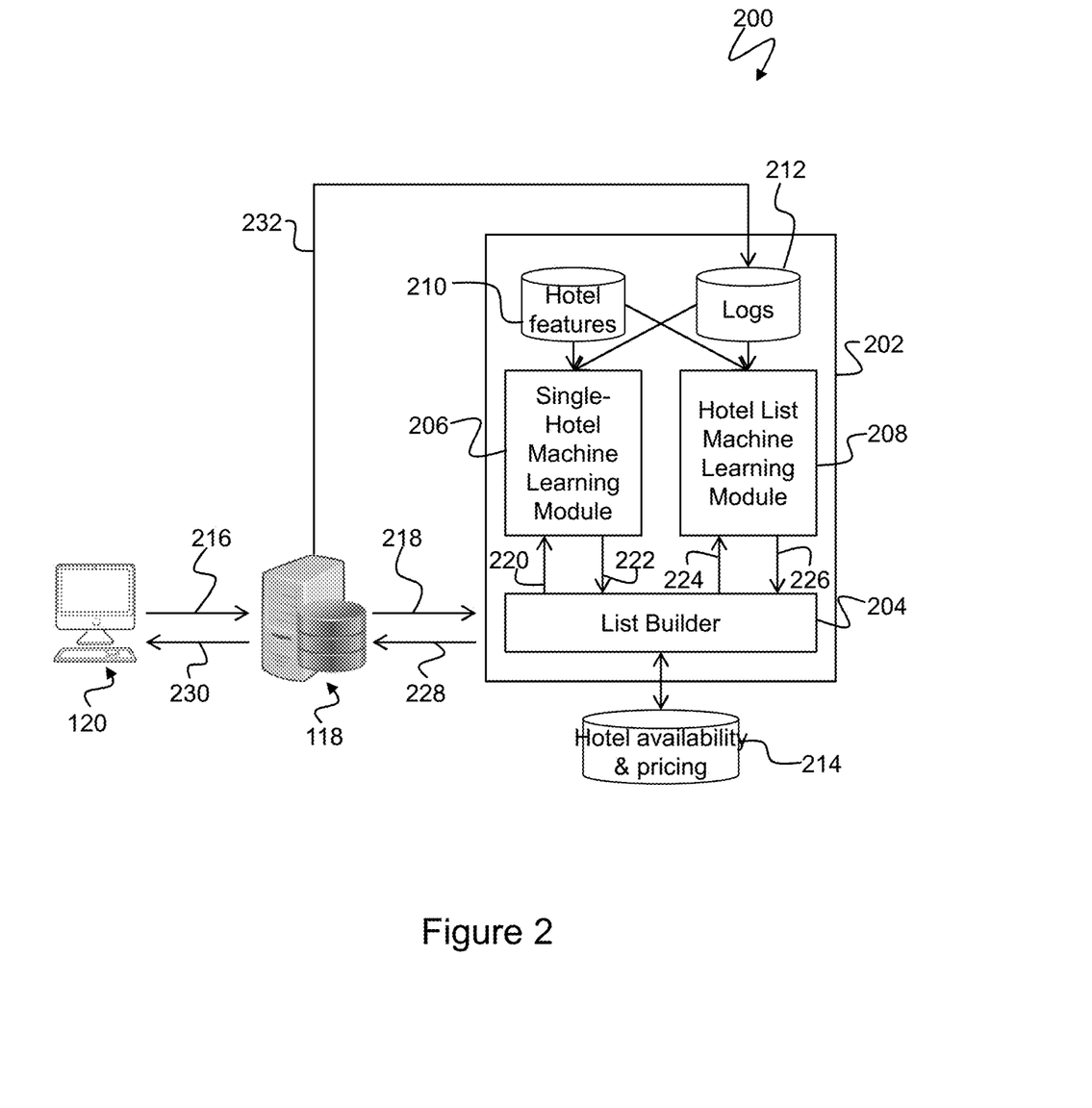
FIG. 2 is a functional block diagram of a travel services recommender system embodying the invention.

FIG. 2 is a functional block diagram 200 of a travel services recommender system embodying the invention. In particular, a recommender system module 202 is configured to provide hotel recommendations to travellers who have made flight bookings via an online travel service provider. The hotel recommender system module 202 comprises a list builder module 204, a single-hotel machine learning module 206, and a hotel list machine learning module 208. These modules communicate with the online travel service system 118, a hotel features database 210, a recommendation engine log database 212, and a hotel information and reservations system 214.

The hotel features database 210 contains records of hotels available for recommendation, comprising characteristics of the hotels that may be employed by the machine learning modules 206, 208 for computing predictions of user interest in, and/or interaction with, hotel recommendations. Such characteristics may include hotel brand, ratings (e.g. star ratings and/or user ratings and sentiments derived from review sites), hotel location, hotel facilities, and so forth. The recommendation log database 212 contains records of previous recommendations and results, including previously presented recommendation lists, prices, identification of recommendations that were selected and reviewed by a user, and records of conversions (i.e. actual purchases made in response to recommendations). Hotel characteristics and recommendation log details are all available for use, either individually or in combination, as features for training and evaluation of the machine learning modules 206, 208. Specific examples of such features employed in an exemplary embodiment are discussed further below, with reference to FIGS. 4 and 5.

The hotel reservations system may be accessed by the list builder module 204 in order to obtain details of hotel availability and pricing for locations and dates corresponding with traveller requirements.

More particularly, traveller and travel details are received from the online travel service system 118 in response to travel bookings made by users via devices 120. Once a booking has been confirmed 216 to the travel service system 118, a Passenger Name Record (PNR) is created in a reservation database that includes passenger (i.e. end-user) personal information and itinerary details. Some or all of the information in the PNR may subsequently be made available to the list builder module, and may be used, either individually or in combination, as features for training and evaluation of the machine learning modules 206, 208. Again, specific examples of such features employed in an exemplary embodiment are discussed further below, with reference to FIGS. 4 and 5.

Following completion of a booking, the travel service system 118 may be configured to present the end-user, via the device 120, with a list of hotel recommendations corresponding with the user's travel itinerary. In order to do so, booking details, including information from the PNR, are transmitted 218 to the recommender system module 202, where they are provided as input to the list builder module 204. An exemplary algorithm in accordance with which the list builder module 204 may be programmed is described in greater detail below with reference to the flowchart 300 in FIG. 3. Broadly, however, the list builder module 204 is configured to generate a set of passenger and itinerary features based upon the information received from the travel service system 118, and to provide these features as input 220 to the single-hotel machine leaning module 206. The single-hotel machine learning module 206 comprises a trained machine learning model (an exemplary embodiment of which is discussed further below with reference to FIG. 4) which is evaluated to generate a list of potential hotel recommendations, each having an associated predicted conversion rate. The predicted conversion rate for each hotel may be regarded as a probability, according to the machine learning model following training on suitable historical data, that the user would book the hotel when presented as an individual recommendation. The list of hotels and predicted conversion rates is returned 222 by the single-hotel machine learning module 206 to the list builder module 204.

Figure 5A:
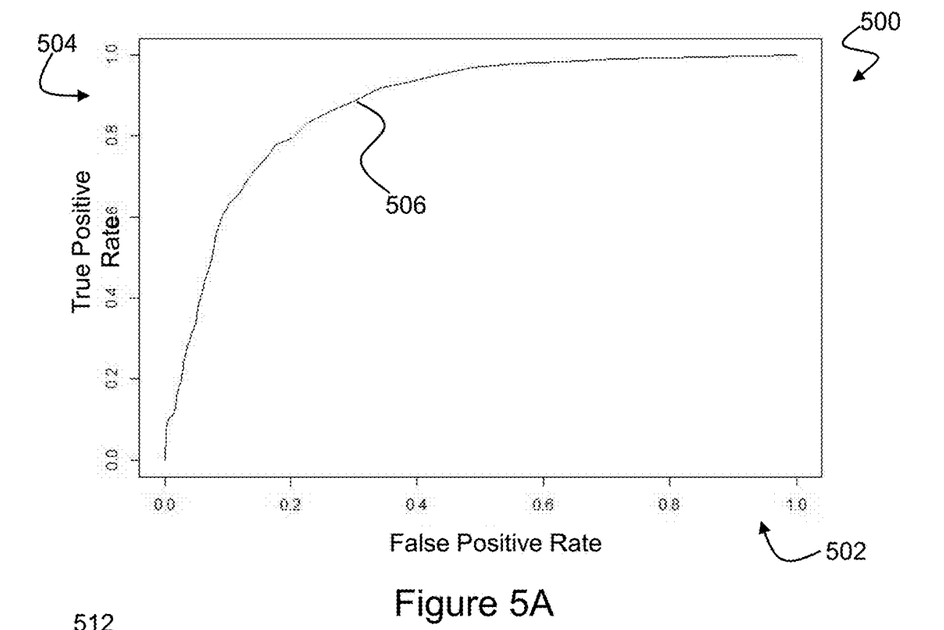
FIG. 5A shows a ROC curve for an exemplary hotel list machine learning model embodying the invention.
Figure 5B:
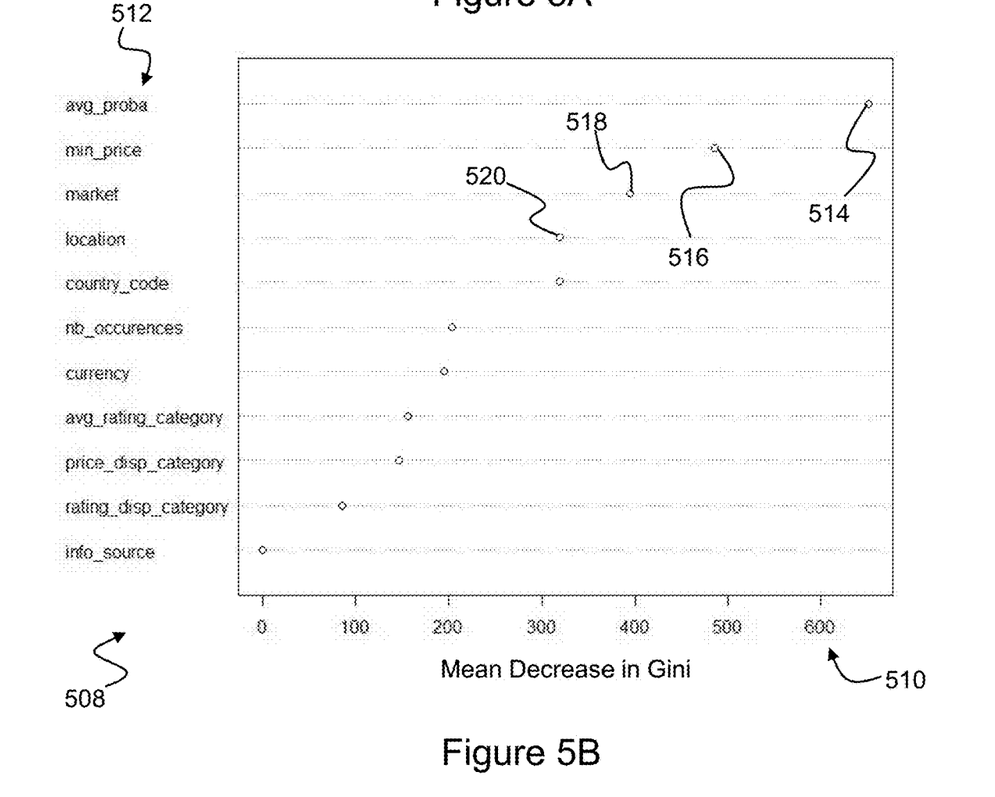
FIG. 5B is a chart illustrating the most significant input features to the exemplary hotel list machine learning model.

The list builder module 204 is configured to generate one or more prospective recommendation lists based upon the list returned by the single-hotel machine learning module 206. For each such list, the list builder module 204 is further configured to generate a set of passenger, itinerary, and list features based upon the information received from the travel service system 118 and the list returned by the single-hotel machine learning module, and to provide these features as input 224 to the hotel list machine leaning module 208. The hotel list machine learning module 208 comprises a trained machine learning model (an exemplary embodiment of which is discussed further below with reference to FIG. 5) which is evaluated to generate a predicted conversion rate for the prospective recommendation list. The predicted conversion rate for the list may be regarded as a probability, according to the machine learning model following training on suitable historical data, that the user would book any one of the recommended hotels when presented with the list. The predicted conversion rate is returned 226 by the hotel list machine learning module 208 to the list builder module 204.

Accordingly, embodiments of the invention employ cascaded machine learning models, operating at the individual hotel level, and at the hotel list level, in order to generate lists of recommendations. The hotel list machine learning model has the benefit of additional features that may be derived from the output of the single-hotel machine learning model, which may enable improved predictions of list conversion rates. A list having a maximum predicted conversion rate may therefore be returned 228 to the travel service system 118 for presentation 230 to the end-user via the device 120. Furthermore, a record of this list, the context, and of any subsequent interactions with the list, may be stored 232 in the recommendation log database 212 for future use, e.g. in training the machine learning modules 206, 208.

Since a higher likelihood of conversion corresponds with a higher probability of user interest in one or more of the hotels included in the list of recommendations, embodiments of the invention are thereby able to deliver improvements in recommendations that are mutually beneficial to the travel service provider and the end-user. Higher conversion rates result in greater revenues for the travel service provider, while recommendations with improved relevance and interest result in higher levels of user satisfaction.

Figure 3:
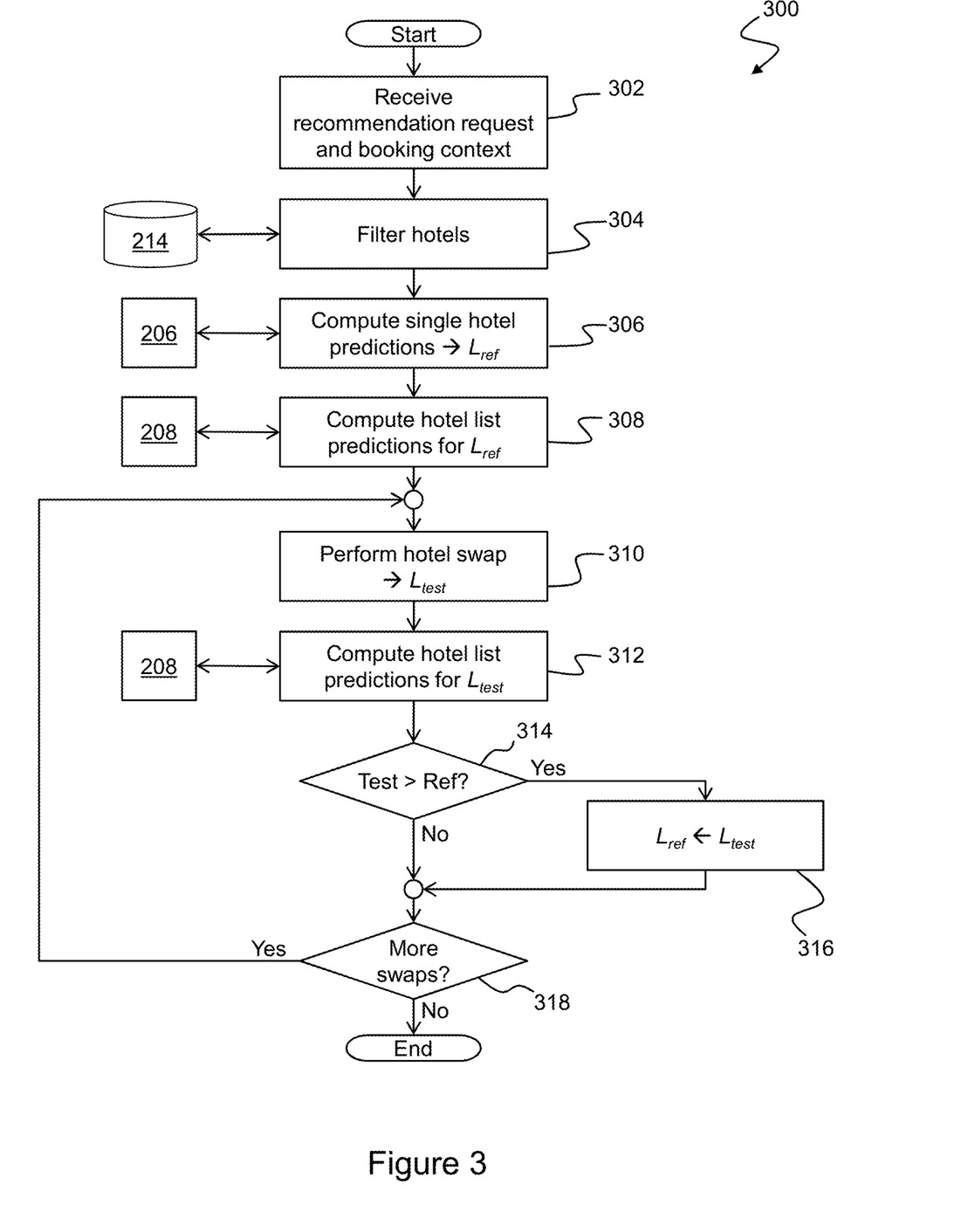
FIG. 3 is a flowchart illustrating an algorithm according to which a list builder module is programmed in an exemplary embodiment of the invention.

FIG. 3 is a flowchart 300 illustrating an algorithm according to which the list builder module 204 is programmed in an exemplary embodiment of the invention. The following discussion is intended to provide the instruction necessary to enable a person skilled in the art of software development to implement data structures and code required to put the exemplary embodiment of the invention into effect. The algorithm represented by the flowchart 300 is a contribution of the invention that requires this additional programming, and is not well-understood, routine, or conventional in the art of machine learning systems.

At step 302, a request for a list of recommendations is received, which includes relevant context information, i.e. passenger personal information and itinerary details obtained from a corresponding PNR. At step 304, a filtered hotel list is generated, by retrieving information regarding availability and pricing of hotels corresponding with the passenger itinerary (i.e. hotels located at or near one or more passenger destinations) from the hotel information and reservations system 214. At step 306, a set of passenger, itinerary, and hotel features is derived from the context information received at step 302 and the availability/pricing information obtained at step 304, and provided as input to the single-hotel machine learning module 206, which returns a corresponding list of hotels and single-hotel predicted conversion rates. An initial ordered reference list, $L_{ref}$, is then generated which comprises a fixed-size subset of the available hotels in the list, corresponding with the number of recommendations to be returned to the travel service system 118. For example, if the user is to be presented with a final list of five recommended hotels, then length of the reference list $L_{ref}$ will be five.

At step 308, a set of passenger, itinerary, and list features is derived from the context information received at step 302 in combination with the contents of the reference list $L_{ref}$, and provided as input to the hotel list machine learning module 208, which returns a corresponding predicted hotel list conversion rate. The objective of the remaining steps in the algorithm 300 is to determine whether the predicted hotel list conversion rate may be increased through an alternative selection of hotels for inclusion in the reference list $L_{ref}$. More particularly, the objective is to maximise the predicted hotel list conversion rate (subject to availability and computational constraints).

More particularly, in accordance with the exemplary algorithm, at step 310 one of the hotels in the reference list $L_{ref}$ is selected and swapped with an alternative hotel from the filtered version of the full list returned by the single-hotel machine learning module 206 to produce a new test list $L_{test}$. Different strategies may be employed in the swapping operation performed at step 310. According to one strategy, which may be termed an 'exhaustive' approach, the swap is performed so as to produce a list $L_{test}$ that has not previously been tried. The process may continue (as described further below) until all possible swaps have been attempted, or until no further substantial improvements in predicted list conversion rate are observed.

According to an alternative strategy, a more 'intelligent' approach to selecting swaps may be employed. In this strategy, each swap may be selected in order to enhance one or several features of the hotel list. The selection may be based on additional information available from the hotel list machine learning module. For example, many machine learning models enable the effect of changes in input features on the output predictions to be evaluated, based on the model structure, computed gradients, and/or simply by evaluating the model using perturbed inputs. Accordingly, swaps may be selected based on variations in features that are expected to have a larger impact on predicted hotel list conversion rates. By way of a concrete example, if the hotel list machine learning module 208 indicates that a lower hotel minimum price would increase the predicted list conversion rate, swaps may be selected to generate new hotel lists $L_{test}$ that include a lower hotel minimum price when compared with the reference list $L_{ref}$.

Regardless of the strategy employed, following selection of a swap, at step 312 a set of passenger, itinerary, and list features is derived from the context information received at step 302 in combination with the contents of the test list $L_{test}$, and provided as input to the hotel list machine learning module 208, which returns a corresponding further predicted hotel list conversion rate. This prediction is compared 314 with the predicted conversion rate of the current reference list $L_{ref}$. If the predicted conversion rate for the list $L_{test}$ is greater than the predicted conversion rate of the current reference list $L_{ref}$, then the reference list is replaced with the test list at step 316.

The algorithm then determines, at decision step 318, whether further swaps should be attempted, and if so then control returns to step 310 for selection of the next swap. As noted above, different stopping criteria may be employed for the decision 318, such as whether all available swaps have been tested, and/or whether the predicted list conversion rate has ceased to improve substantially, which may indicate that testing further swaps is unlikely to result in significant further improvements in the recommendations.

A range of different machine learning models may be employed in the single-hotel and hotel list machine learning modules 206, 208. Suitable models may include regression models, Bayesian models, collaborative filtering models, artificial neural networks, decision trees, gradient boosting machines, ensemble models, and so forth. The single-hotel machine learning module 206 and hotel list machine learning module 208 may employ similar or different models. The most appropriate and effective models may depend upon the specific application of the recommender system, and on the available data and features characterising the goods, service, or other items to be recommended, and the available user profile data. Techniques and processes for selecting, developing, training, validating, testing, and optimising suitable machine learning models are known to persons skilled in the art of machine learning. By way of example, an implementation of the single-hotel and hotel list machine learning modules 206, 208 will now be described in which both modules comprise random forest machine learning models.

In the exemplary embodiment, training of the machine learning models is carried out using data from one year of user activity. The available data for training, validation and testing of the models includes hotel features stored in the hotel features database 210, along with logs of actual user behavior—including conversions for single hotels and pricing, and details of the corresponding lists from which the single hotels were selected—stored within the recommendation log database 212.

Figure 4A:
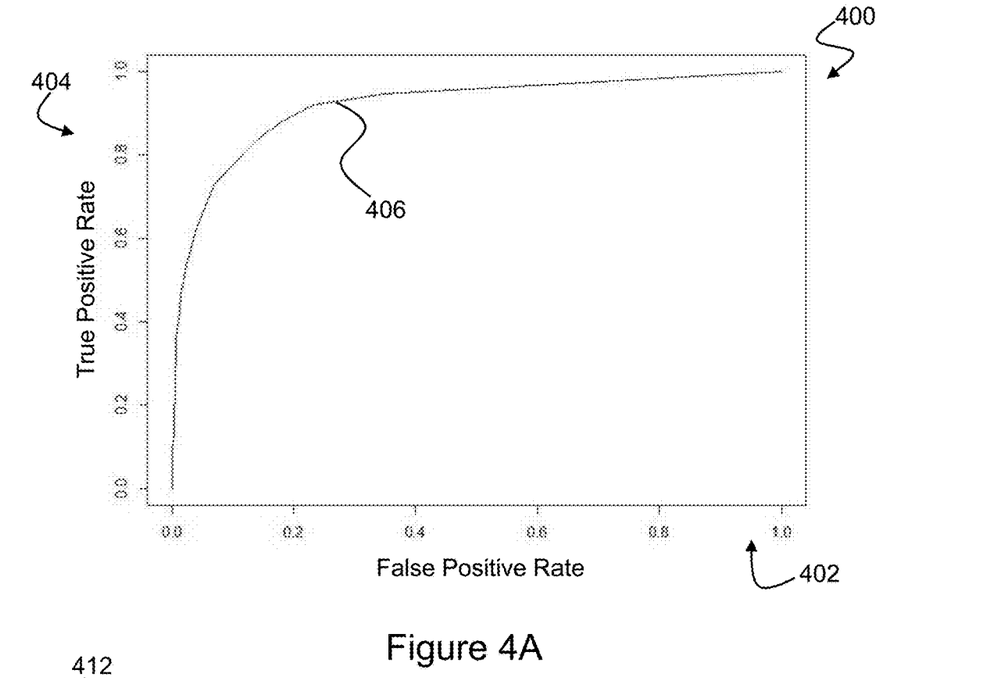
FIG. 4A shows a Receiver Operating Characteristic (ROC) curve for an exemplary single-hotel machine learning model embodying the invention.

For the single-hotel machine learning module 206, a random forest model was trained having a forest size, $n_{trees}=100$, and unlimited maximum depth. The resulting receiver operating characteristic (ROC) curve 400 is shown in FIG. 4A, in which the horizontal axis 402 shows the false positive (FP) rate, and the vertical axis 404 shows the true positive (TP) rate. The ROC curve 406 plots these properties of the model as a function of decision threshold. Good performance was achieved following training of this model, with 6.55% prediction error on the training sample for an optimum decision threshold, and overall AUC (i.e. area under the ROC curve) of 0.91.

Figure 4B:
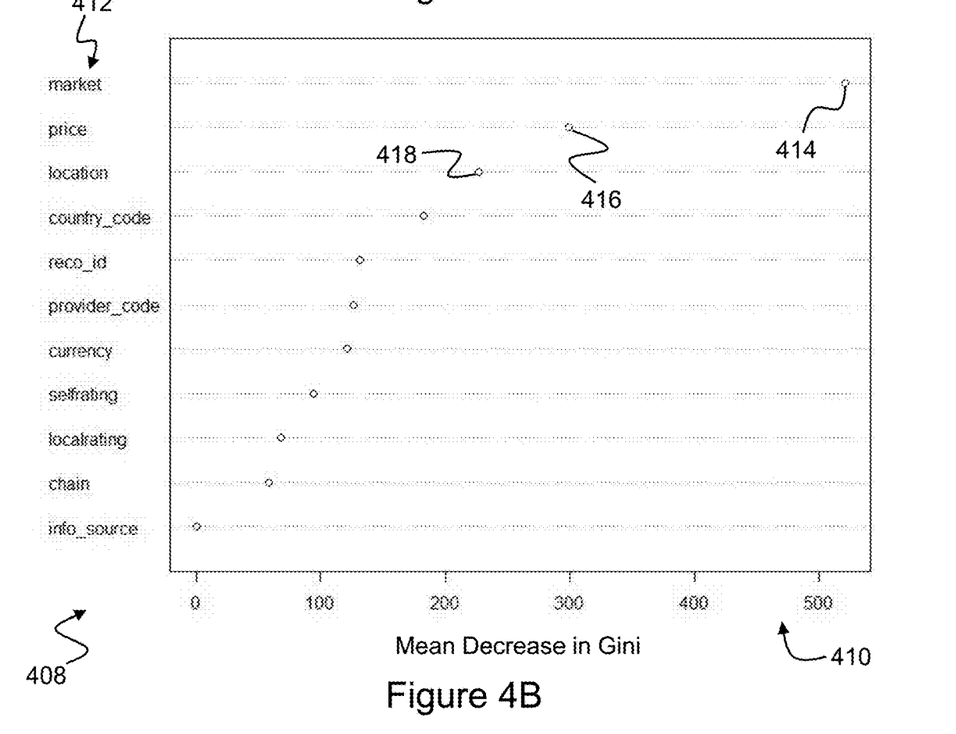
FIG. 4B is a chart illustrating the most significant input features to the exemplary single-hotel machine learning model.

FIG. 4B is a chart 408 illustrating the most significant input features to the random forest model at the single-hotel level. The horizontal axis 410 shows 'mean decrease in Gini', which is a measure of the change in 'purity' of a feature following splits in the decision trees of the forest. Features which exhibit larger decrease in Gini have a greater influence on the ultimate decision, and can therefore be considered more important. The mean decrease in Gini is therefore a useful measure to observe during feature selection and engineering. The vertical axis 412 is a list of input features to the model. The most significant features for the single-hotel machine learning model are the point-of-sale market 414, hotel price 416, and hotel location (city and country) 418. Other features employed for training and evaluation of the single-hotel machine learning model include: country code of the hotel location (designated country_code in the chart 408); on-screen position of the recommendation (reco_id); hotel provider (provider_code); currency of payment (currency); ratings from different sources (self_rating, local_rating); hotel chain name (chain); and source of additional enriched passenger profile information (info_source).

For the hotel list machine learning module 208, a further random forest model was trained, again having a forest size, $n_{trees}=100$, and unlimited maximum depth. The resulting ROC curve 500 is shown in FIG. 5A, in which the horizontal axis 502 shows FP rate, and the vertical axis 504 shows TP rate. The ROC curve 506 plots these properties of the model as a function of decision threshold. Good performance was achieved following training of this model, with overall AUC of 0.85.

FIG. 5B is a chart 508 illustrating the most significant input features to the random forest model at the hotel list level. The horizontal axis 510 shows mean decrease in Gini for each of the input features listed on the vertical axis 512. Notably, the top two features by this measure are derived from the single hotel predictions, namely the average probability of a user click on a hotel within a list 514, and the minimum hotel price presented to the user 516. The next two features are features that are also available as inputs to the single-hotel model, namely the point-of-sale market 518 and the hotel location 520. Other features employed for training and evaluation of the hotel list machine learning model include country code of the hotel location (designated country_code in the chart 508); number of hotels in the recommendation list (nb_occurrences); currency of payment (currency); average rating of all hotels in the list (agv_rating_category); range of prices in the list (price_disp_category); range of ratings in the list (rating_disp_category); and source of additional enriched passenger profile information (info_source).

Figure 6:
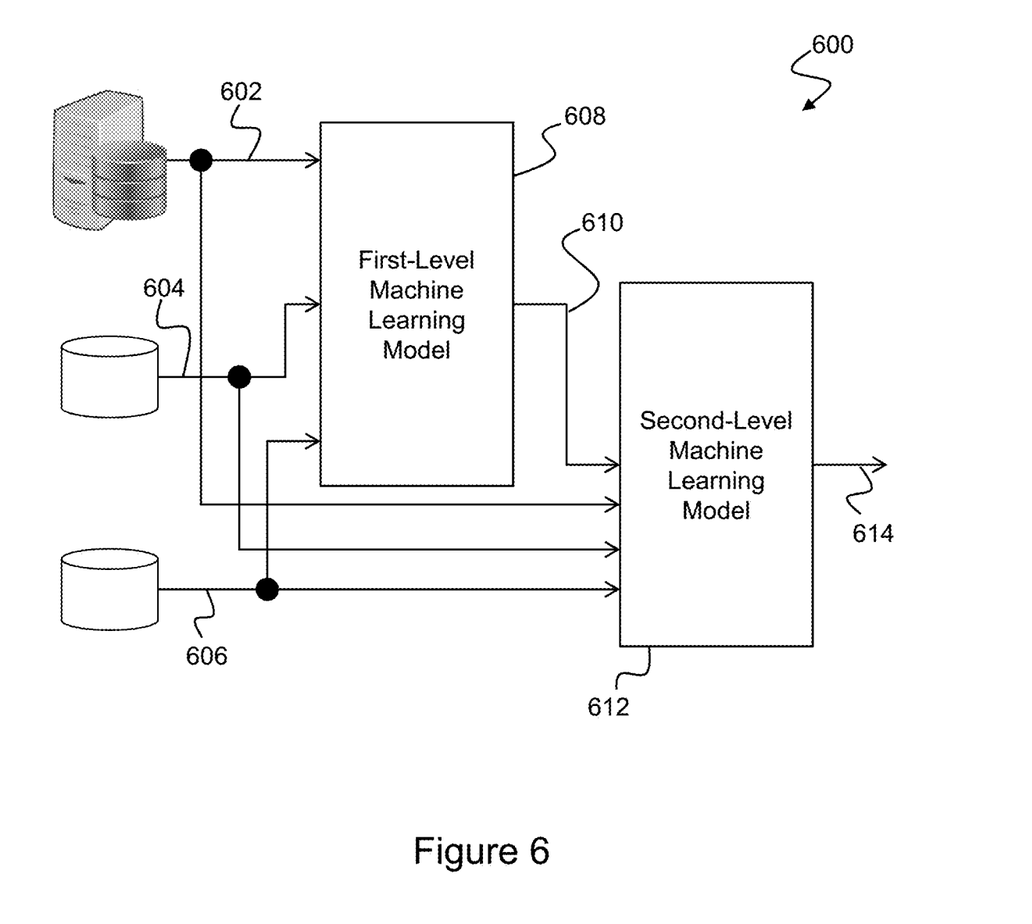
FIG. 6 is a block diagram illustrating a two-stage cascaded machine learning recommender system embodying the invention.

As will be appreciated from the above discussion, cascading of predictions from the single-hotel machine learning model into input features of the hotel list machine learning model is a particularly advantageous aspect of embodiments of the invention. FIG. 6 is a block diagram 600 which illustrates how this contribution generalises to other types of recommender system. Overall inputs to the system 600 include contextual information 602 including user profile data, feature information 604 corresponding with goods, services, or other items to be recommended, and historical data 606 comprising logs of past recommendations and corresponding user actions (e.g. clicks, selections, purchases, and so forth). The historical data 606 and feature information 604 may be used for training, validation, and testing of machine learning models, while the contextual information 602 and feature information 604 may be used for evaluation and prediction using the trained machine learning models.

The system 600 comprises a first-level machine learning model 608, which is trained to generate predictions of user behavior (e.g. clicks, selections, purchases) in relation to individual goods, services, or other items. The first-level model 608 employs the feature information 604 and historical data 606 inputs for training, and the contextual information 602 and feature information 604 inputs for prediction, and produces a prediction output 610.

The system 600 further comprises a second-level machine learning model 612, which is trained to generate predictions of user behavior (e.g. clicks, selections, purchases) in relation to lists of recommendations of goods, services, or other items. The second-level model 612 employs the feature information 604 and historical data 606 inputs for training, and the contextual information 602 and feature information 604 inputs for prediction. Additionally, the second-level machine learning model employs cascaded prediction outputs 610 from the first-level model 608 for both training and prediction. The overall output 614 from the system 600 is a prediction from the second-level model 612 of user behavior in relation to a list comprising goods, services, or other items for which individual predictions have been obtained using the first-level model 608. The system 600 may therefore be employed in conjunction with a list building algorithm, such as the exemplary algorithm described above with reference to FIG. 3, to generate lists of recommendations having an increased likelihood of user interaction when compared with lists generated using a single, item-level, prediction module alone.

It should be appreciated that while particular embodiments and variations of the invention have been described herein, further modifications and alternatives will be apparent to persons skilled in the relevant arts. In particular, the examples are offered by way of illustrating the principles of the invention, and to provide a number of specific methods and arrangements for putting those principles into effect. In general, embodiments of the invention comprise a two-stage cascaded machine learning recommender system, in which two machine learning modules are deployed to build a recommendation list. Output of the first-level machine learning model is used to predict pertinent user interaction behavior (e.g. conversion probability) at a single-item level. The first-level output is then used as an input for the second-level machine learning model, which in turn computes a prediction of user interactions in relation to an ordered list of items.

Embodiments of the invention also implement a list-building algorithm configured to generate lists with improved predictions of user interaction by exploring a set of possible recommendation lists, given the interaction probabilities computed by the two-stage cascaded machine learning models.

Furthermore, embodiments of the invention are able to combine multiple data feeds to build a more complete picture richer knowledge about the user context (e.g., in the case of a travel booking system, personal information and travel itinerary), individual item characteristics, and historical recommendations and user response. Features for the machine learning models may be engineered to improve recommender system performance based on features obtained from the rich context built from the data combination.

Accordingly, the described embodiments should be understood as being provided by way of example, for the purpose of teaching the general features and principles of the invention, but should not be understood as limiting the scope of the invention, which is as defined in the appended claims.

The invention claimed is:

1. A computer-implemented method of providing personalized recommendations to a user of items available, the method comprising:

at a system comprising one or more processors:
training a first-level machine learning model based on a first recommendation relationship process for each iteration of a first plurality of iterations by:
obtaining feature information corresponding with past recommendations for a plurality of users;
obtaining historical data comprising logs of the past recommendations and corresponding user actions for the plurality of users;
evaluating the feature information and the historical data corresponding to one or more past recommendations associated with at least one traveler;
counting a number of times a characteristic of the at least one traveler is associated with a certain recommendation; and
selecting, as an output of the first-level machine learning model, one or more recommendation relationship features for inclusion in machine-learned recommendation lists using a pre-defined statistical threshold that defines a minimal causal relationship that exists between a particular recommendation relationship feature and patterns before that particular recommendation relationship feature is included in one or more of the machine-learned recommendation lists;
training a second-level machine learning model based on a first recommendation relationship process for each iteration of a first plurality of iterations by:
obtaining the feature information and the historical data;
obtaining the output of the first-level machine learning model;
evaluating the feature information and the historical data corresponding to one or more recommendations associated with at least one traveler based on the output of the first-level machine learning model;
counting a number of times a characteristic of the at least one traveler is associated with a certain recommendation; and
selecting, as an output of the second-level machine learning model and based on the output of the first-level machine learning model, one or more recommendation relationship features for updating the machine-learned recommendation lists using a pre-defined statistical threshold that defines a minimal causal relationship that exists between a particular recommendation relationship feature and patterns before that particular recommendation relationship feature is included in the one or more machine-learned recommendation lists;
receiving, via a communications channel, context data comprising user information;
computing a plurality of first-level features comprising context features based upon the context data;
generating, by the first-level machine learning model using the first-level features, predictions of conversion rates in relation to a plurality of individual items that are available;
constructing a first list of proposed item recommendations of a plurality of lists of proposed item recommendations based upon the predictions generated by the first-level machine learning model;
determining a personalized list of item recommendations based on iteratively evaluating for third plurality of iterations one or more of the plurality of lists of proposed item recommendations by the second-level machine learning model, wherein each iteration of the third plurality of iterations comprises:
generating a second list of proposed item recommendations of the plurality of lists of proposed item recommendations by swapping a proposed item recommendation in the first list of proposed item recommendations based upon the predictions generated by the first-level machine learning model;
computing a plurality of second-level features comprising context features based upon the context data and list features based upon the second list of proposed item recommendations and the corresponding predictions generated by the first-level machine learning model;

generating, by the second-level machine learning model using the second-level features, a prediction of conversion rates in relation to the second list of proposed item recommendations; and determining the personalized list of item recommendations based upon the prediction generated by the second-level machine learning model by:

comparing the predicted conversion rates generated on a current iteration in relation to the second list of proposed item recommendations with a predicted conversion rate generated on a prior iteration, and in an event that the comparison determines that the predicted conversion rates generated on the current iteration are greater than the predicted conversion rate generated on the prior iteration, replacing the first list of proposed item recommendations with the second list of proposed item recommendations; and providing, via the communications channel, the personalized list of item recommendations.

2. The method of claim 1 wherein swapping the proposed item recommendation in the first list of proposed item recommendations comprises selecting a swap that generates a previously untested list of recommendations from the plurality of individual items for which predictions were generated by the first-level machine learning model, and the iteration continues until a stopping condition is satisfied.

3. The method of claim 2 wherein the stopping condition is that all potential lists of recommendations have been exhausted.

4. The method of claim 1 wherein swapping the proposed item recommendation in the first list of proposed item recommendations comprises selecting a swap that enhances at least one of the second-level features relative to an expected change in the prediction of conversion rates in relation to a test list of proposed item recommendations, and the iteration continues until a stopping condition is satisfied.

5. The method of claim 4 wherein the stopping condition is that the prediction of conversion rates in relation to the first list of proposed item recommendations is not expected to become substantially more favourable by further iteration.

6. The method of claim 1 wherein the first-level machine learning model is trained using item features associated with each available item, and historical data of prior conversion rates in response to presentations of the personalized recommendations.

7. The method of claim 6 wherein the second-level machine learning model is trained using the historical data of prior conversion rates in response to presentations of personalized recommendation and corresponding prediction data generated by evaluation of the first-level machine learning model.

8. The method of claim 1 wherein the list features include one or more aggregated list features comprising:

an average prediction of conversion rates in relation to individual items included in the second list of proposed item recommendations;

a minimum item cost of individual items included in the second list of proposed item recommendations;

an number of individual items in the second list of proposed item recommendations;

an average value of a rating score associated with individual items in the second list of proposed item recommendations;

a range of costs of individual items included in the second list of proposed item recommendations; or a range of values of a rating score associated with individual items in the second list of proposed item recommendations.

9. The method of claim 1 where the prediction of conversion rates comprises a probability of the user clicking on a link corresponding with an item presented in the personalized list of item recommendations, a probability of the user completing an online purchase of an item presented in the personalized list of item recommendations, or a combination thereof.

10. The method of claim 1 wherein the online system is an online travel service system, the context data comprises information stored in a passenger name record (PNR) associated with an online flight booking booked through the online travel service system, and the individual items comprise accommodation reservations.

11. A computing system for providing personalized recommendations to a user of items available, the computing system comprising:

a processor;

at least one memory device that is accessible by the processor; and a communications interface that is accessible by the processor, wherein the at least one memory device contains program instructions which, when executed by the processor, cause the computing system to implement a method comprising:

training a first-level machine learning model based on a first recommendation relationship process for each iteration of a first plurality of iterations by:

obtaining feature information corresponding with past recommendations for a plurality of users;

obtaining historical data comprising logs of the past recommendations and corresponding user actions for the plurality of users;

evaluating the feature information and the historical data corresponding to one or more past recommendations associated with at least one traveler;

counting a number of times a characteristic of the at least one traveler is associated with a certain recommendation; and selecting, as an output of the first-level machine learning model, one or more recommendation relationship features for inclusion in machine-learned recommendation lists using a pre-defined statistical threshold that defines a minimal causal relationship that exists between a particular recommendation relationship feature and patterns before that particular recommendation relationship feature is included in one or more of the machine-learned recommendation lists;

training a second-level machine learning model based on a first recommendation relationship process for each iteration of a first plurality of iterations by:

obtaining the feature information and the historical data;

obtaining the output of the first-level machine learning model;

evaluating the feature information and the historical data corresponding to one or more recommendations associated with at least one traveler based on the output of the first-level machine learning model;

counting a number of times a characteristic of the at least one traveler is associated with a certain recommendation; and selecting, as an output of the second-level machine learning model and based on the output of the first-level machine learning model, one or more recommendation relationship features for updating the machine-learned recommendation lists using a pre-defined statistical threshold that defines a minimal causal relationship that exists between a particular recommendation relationship feature and patterns before that particular recommendation relationship feature is included in the one or more machine-learned recommendation lists;

receiving, via the communications interface, context data comprising user information;

computing a plurality of first-level features comprising context features based upon the context data;

generating, by the first-level machine learning model using the first-level features, predictions of conversion rates in relation to a plurality of individual items that are available;

constructing a first list of proposed item recommendations of a plurality of lists of proposed item recommendations based upon the predictions generated by the first-level machine learning model;

determining a personalized list of item recommendations based on iteratively evaluating one or more of the plurality of lists of proposed item recommendations by the second-level machine learning model, wherein each iteration comprises:
  generating a second list of proposed item recommendations of the plurality of lists of proposed item recommendations by swapping a proposed item recommendation in the first list of proposed item recommendations based upon the predictions generated by the first-level machine learning model;
  computing a plurality of second-level features comprising context features based upon the context data and list features based upon the second list of proposed item recommendations and the corresponding predictions generated by the first-level machine learning model;
  generating, by the second-level machine learning model using the second-level features, a prediction of conversion rates in relation to the second list of proposed item recommendations; and
  determining the personalized list of item recommendations based upon the prediction generated by the second-level machine learning model by:
    comparing the predicted conversion rates generated on a current iteration in relation to the second list of proposed item recommendations with a predicted conversion rate generated on a prior iteration, and
    in an event that the comparison determines that the predicted conversion rates generated on the current iteration is greater than the predicted conversion rate generated on the prior iteration, replacing the first list of proposed item recommendations with the second list of proposed item recommendations; and providing, via the communications interface, the personalized list of item recommendations.

12. A computer program product comprising a computer-readable medium having instructions stored thereon which, when executed by a processor implement a method of providing personalized recommendations to a user of items available the method comprising:

at a system comprising a processor:
training a first-level machine learning model based on a first recommendation relationship process for each iteration of a first plurality of iterations by:
  obtaining feature information corresponding with past recommendations for a plurality of users;
  obtaining historical data comprising logs of the past recommendations and corresponding user actions for the plurality of users;
  evaluating the feature information and the historical data corresponding to one or more past recommendations associated with at least one traveler;
  counting a number of times a characteristic of the at least one traveler is associated with a certain recommendation; and
  selecting, as an output of the first-level machine learning model, one or more recommendation relationship features for inclusion in machine-learned recommendation lists using a pre-defined statistical threshold that defines a minimal causal relationship that exists between a particular recommendation relationship feature and patterns before that particular recommendation relationship feature is included in one or more of the machine-learned recommendation lists;
training a second-level machine learning model based on a first recommendation relationship process for each iteration of a first plurality of iterations by:
  obtaining the feature information and the historical data;
  obtaining the output of the first-level machine learning model;
  evaluating the feature information and the historical data corresponding to one or more recommendations associated with at least one traveler based on the output of the first-level machine learning model;
  counting a number of times a characteristic of the at least one traveler is associated with a certain recommendation; and
  selecting, as an output of the second-level machine learning model and based on the output of the first-level machine learning model, one or more recommendation relationship features for updating the machine-learned recommendation lists using a pre-defined statistical threshold that defines a minimal causal relationship that exists between a particular recommendation relationship feature and patterns before that particular recommendation relationship feature is included in the one or more machine-learned recommendation lists;
receiving, via a communications channel, context data comprising user information;
computing a plurality of first-level features comprising context features based upon the context data;
generating, by the first-level machine learning model using the first-level features, predictions of conversion rates in relation to a plurality of individual items that are available;
constructing a first list of proposed item recommendations of a plurality of lists of proposed item recommendations based upon the predictions generated by the first-level machine learning model;

determining a personalized list of item recommendations based on iteratively evaluating one or more of the plurality of lists of proposed item recommendations by the second-level machine learning model, wherein each iteration comprises:
  generating a second list of proposed item recommendations of the plurality of lists of proposed item recommendations by swapping a proposed item recommendation in the first list of proposed item recommendations based upon the predictions generated by the first-level machine learning model;
  computing a plurality of second-level features comprising context features based upon the context data and list features based upon the second list of proposed item recommendations and the corresponding predictions generated by the first-level machine learning model;
  generating, by the second-level machine learning model using the second-level features, a prediction of conversion rates in relation to the second list of proposed item recommendations; and determining the personalized list of item recommendations based upon the prediction generated by the second-level machine learning model by:
  comparing the predicted conversion rates generated on a current iteration in relation to the second list of proposed item recommendations with a predicted conversion rate generated on a prior iteration, and
  in an event that the comparison determines that the predicted conversion rates generated on the current iteration is greater than the predicted conversion rate generated on the prior iteration, replacing the first list of proposed item recommendations with the second list of proposed item recommendations; and providing, via the communications channel, the personalized list of item recommendations.

* * * * *